Feb. 3, 1948.  M. D. MANN, JR  2,435,229
KNEADER POLYMERIZATION PROCESS FOR OLEFINS
Filed June 23, 1944   8 Sheets-Sheet 1

FIG.-1

Matthew D. Mann Jr. Inventor
By [signature] Attorney

Feb. 3, 1948. M. D. MANN, JR 2,435,229
KNEADER POLYMERIZATION PROCESS FOR OLEFINS
Filed June 23, 1944 8 Sheets-Sheet 7

FIG.-6

Matthew D. Mann Jr. Inventor
By [signature] Attorney

FIG.-7

Patented Feb. 3, 1948

2,435,229

UNITED STATES PATENT OFFICE 2,435,229

KNEADER POLYMERIZATION PROCESS FOR OLEFINS

Matthew D. Mann, Jr., Roselle, N. J., assignor, by mesne assignments, to Jasco, Incorporated, a corporation of Louisiana Application June 23, 1944, Serial No. 541,775

11 Claims. (Cl. 260—93)

This invention relates to processes for the low temperature polymerization of olefinic substances; relates particularly to continuous low temperature polymerization processes in which portions of the materials are recycled; and relates especially to methods for separating the polymer from the recycle stream without loss of recycle material; and further relates to methods for the reduction of fire and industrial poisoning hazard otherwise inherent in unconfined hydrocarbon vapors.

Isobutylene and mixtures containing isobutylene polymerize readily at low temperatures in the presence of an active halide catalyst into very high molecular weight plastic, elastic, rubber-like substances. This polymerization reaction is conveniently conducted at temperatures ranging from $-10°$ C. to $-165°$ C. or even lower, preferably within the temperature range of $-40°$ C. to $-80°$ C.; the reaction mixture preferably contains as the major polymerizable constituent, an isoolefin such as isobutylene. It may contain in addition substantial portions of other olefins, diolefins, diluents, refrigerants, olefins, etc. Various low boiling liquids such as liquid propane, liquid ethylene, or liquid ethane are preferably used as refrigerants; carbon dioxide, either solid or liquid, in solution in the hydrocarbon material is likewise useful; and various diluents such as propyl, ethyl or methyl chloride, and other similar substances are also useful. The polymerization may be conducted in batch operation, but great difficulty is encountered in recovering the various refrigerants, diluents and unpolymerized reactants, since most of them are gases at room temperature, and even at temperatures only slightly above the reaction temperature.

These characteristics of the substances making up the reaction mixture, together with the very great stickiness and solid character of the polymeric product, makes it exceedingly difficult to separate the polymer from the reaction mixture without the loss of undesirable large portions of the gaseous diluent-refrigerant and the development of a serious fire hazard and industrial poisoning hazard which otherwise arises when substantial quantities of gaseous hydrocarbons are freed in a room. Such hydrocarbons yield combustible or explosive mixtures with air, when more than a very small percentage of the hydrocarbons is present, and at concentrations below the explosive or combustible range, they may still cause serious hazard of industrial poisoning.

The present invention provides a new polymerization process for the separation and recovery of the solid polymer and the volatilized gaseous portions of the reactant mixture, substantially without loss of any of the volatilized diluent-refrigerant or reactant substances; thereby avoiding the loss of valuable materials and, in addition, avoiding the development of fire or industrial poisoning hazard.

The process is particularly advantageous for the preparation of copolymers of an isoolefin with a polyolefin, isobutylene being the preferred isoolefin; 2, methyl butene-1 and 2, methyl pentene-1 likewise being useable under some circumstances. The polyolefin may be isoprene, piperylene, dimethyl butadiene and, in fact, substantially any of the polyolefins having 2 or more double linkages, whether conjugated or non-conjugated with carbon numbers from 5 to 12 or 14 inclusive per molecule being satisfactorily useable. Butadiene is also useable under certain circumstances but is not a preferred component, since it is difficult to get a fully satisfactory polymer when the yield is carried to the extent required for satisfactory operation of the process.

Broadly, the process of the invention consists of the polymerization of the olefinic material in a kneader under the influence of kneader blades; the solid polymer being passed through a series of kneaders and processed in each one, and then worked during an extrusion step to complete the separation of polymer and diluent-refrigerant or unpolymerized olefin while separating the polymer from gaseous material and discharging both from the reactor system.

The reactor vessel may be a container adjacent to and associated with the extruder member, the reactor vessel preferably containing kneader blades for transferring the solid polymer to the extruder; or the reactor vessel may consist of a plurality of members arranged in cascade, each with kneader blades for transferring the polymer from one chamber to the next. The reactor system may be jacketed with a coolant to maintain the desired low reaction temperature within the range between $-10°$ C. and $-165°$ C., preferably within the range between $-50°$ C. and $-165°$ C., with the solid polymer being consolidated and ejected by the extruder screws. Alternatively, and preferably, if the polymerization is conducted in an adjacent, associated reaction vessel and the solid polymer is transferred from the reaction vessel to the extruder, the extruder is preferably equipped with a heating means such as a steam jacket, in order to volatilize from the solid polymer, any residual traces of the various components of the reaction mixture, and to condition the solid polymer for easier extrusion. When the reaction is conducted in an adjacent, cooperating reaction chamber, either in a single reaction chamber, or in a plurality of reaction chambers, they are desirably heat insulated, and may conveniently be jacketed with coolant, as previously described.

The extruder and the reaction vessels, if such are used, are preferably tightly closed with solid covers, and are provided with supply pipelines for the delivery of the various component parts of the reaction mixture to the reactor, and are further provided with discharge lines for the transfer of volatilized portions of the mixture to recycle equipment in which the mixed gases are fractionated, cooled and condensed for reuse as portions of a further quantity of reaction mixture.

Thus an object of the invention is to polymerize an olefinic material continuously, while continuously removing from the polymerization container the solid polymer, and recovering substantially all of the volatilized reaction mixture components for reuse and recycling, while avoiding the development of fire hazard or industrial poisoning hazard, by the association with the reaction container of an extruder mechanism which ejects only the solid polymer from the reaction mixture. Another object is to copolymerize an isoolefin and a polyolefin by the application thereto of a catalyst under the influence of kneader blades. Other objects and details of the invention will be apparent from the following description when read in connection with the accompanying drawings; wherein.

This application is a continuation-in-part of my co-pending application Serial No. 368,967, filed December 7, 1940, for polymerization apparatus; which in turn is a continuation-in-part of my application Serial No. 684,813, filed August 12, 1933, now Patent Number 2,229,661, issued January 28, 1941, and copending with Serial No. 368,967; and of my application Serial No. 249,682, filed January 7, 1939, now Patent Number 2,360,-632, issued October 17, 1944.

A convenient embodiment of the process of the invention utilizes a series, or cascade of "Werner & Pfleiderer" type of kneaders, in combination with a screw type extruder, within which the polymerization reaction occurs, the whole structure being closed gas-tight, with sealed covers, and supply lines for the various components of the reaction mixture, discharge lines for the removal of the vaporized constituents, and the extruder outlet for the discharge of the solid polymer. The reaction mix components are preferably delivered through pipes to the first, uppermost kneader, and the polymerization initiated therein. The polymerization reaction liberates relatively very large quantities of heat, which quantities of heat are absorbed by the diluent-refrigerant, usually liquid ethane or liquid ethylene present in the reaction mixture. The reaction is rapid and the heat of reaction volatilizes a major portion of the diluent-refrigerant to practically all of the diluent-refrigerant.

During the reaction, with isobutylene as the reactant, practically all of the isobutylene is converted into the solid polymer which is transferred by the kneader blades into the next adjacent kneader device in the cascade sequence. In this second kneader, and to some extent in the first kneader as well, the solid polymer is cut and broken into relatively small granules or crumbs, and residual quantities of the diluent-refrigerant and any unpolymerized reactants are largely driven off from the solid polymer. The breaking up and degassing may be continued in a third kneader to which the solid polymer is transferred by the blades of the second kneader, and at the conclusion of treatment in the third kneader, the material is delivered into a heated extruder, in which substantially all of the diluent-refrigerant, catalyst, and any other volatile materials are volatilized from the solid polymer, under a plenum or low gas pressure, and the solid polymer is discharged through the extruder nozzle as a continuous stream which seals the discharge from the reactors against leakage of volatilized gas; thereby avoiding the loss and wastage of valuable materials; avoiding the development of a fire hazard from admixture of these hydrocarbon gases with air, and avoiding the development of an industrial poisoning hazard, since most of these substances have anaesthetic and poisonous properties; and, in addition, permitting of the return of the volatilized gaseous materials to appropriate purifying and condensing devices for reuse in the preparation of further portions of polymer.

In the event that mixed olefins are used such as isobutylene with isoprene or with piperylene or with dimethyl butadiene, the reaction may or may not be carried to completion. Satisfactory operation of the kneading step requires that the several kneaders be well filled with reasonably solid material, and a stage of polymerization of from 70% to 80% of completion is convenient to obtain a satisfactory copolymer, and easy transfer of the polymer from kneader to kneader and to extruder. With isoprene, piperylene, dimethyl butadiene and the higher olefins, relatively small quantities ranging from ½ part mixed with 99.5 parts of isobutylene to 10 parts mixed with 90 parts of isobutylene yields a satisfactory polymer, since the proportion of diolefin which interpolymerizes does not depart very widely from the proportions in which it is present. With butadiene, however, it is found that the butadiene does not interpolymerize in the proportion in which it is present, but that a relatively very large excess is required to cause the interpolymerization of the desired relatively small amount, and accordingly, as the isobutylene is interpolymerized, it is used up, leaving in the reactor a mixture which may contain an undue proportion of butadiene with respect to the proportion of isobutylene, from which a copolymer undesirably high in butadiene is obtained. The resulting copolymer, especially when it includes the polyolefins, is reactive with sulfur in a curing reaction which destroys the property of cold flow and plasticity to yield a tensile strength ranging from 1200 to 4600 pounds at break with an elongation at break ranging from 400% to 1200%, together with phenomenally high abrasion resistance, flexure resistance, ozone resistance and similar properties, much superior to those of natural rubber.

Referring to the figures, a base plate member 1 is provided, upon which the frame members 2 of the reactors are mounted. As is particularly well shown in Fig. 2, the frame members 2 form the sides, ends and bottoms of a series of kneader-mixers in which there are located "S" type kneading and mixing blades 3. These blades 3 operate in pairs, as shown, and each pair of blades has its own frame and housing as is shown in the drawings. The respective housings are covered and closed by covers 4, 5 and 6, respectively, equipped with sight glasses or inspection windows 7, 8 and 9. Each housing, except the last, may if desired, be equipped with a discharge opening controlled by an adjustable gate 11, which is moved up and down by a threaded rod 12 controlled by a hand wheel and nut assembly 14; this gate structure may usually be omitted however.

Figure 7:
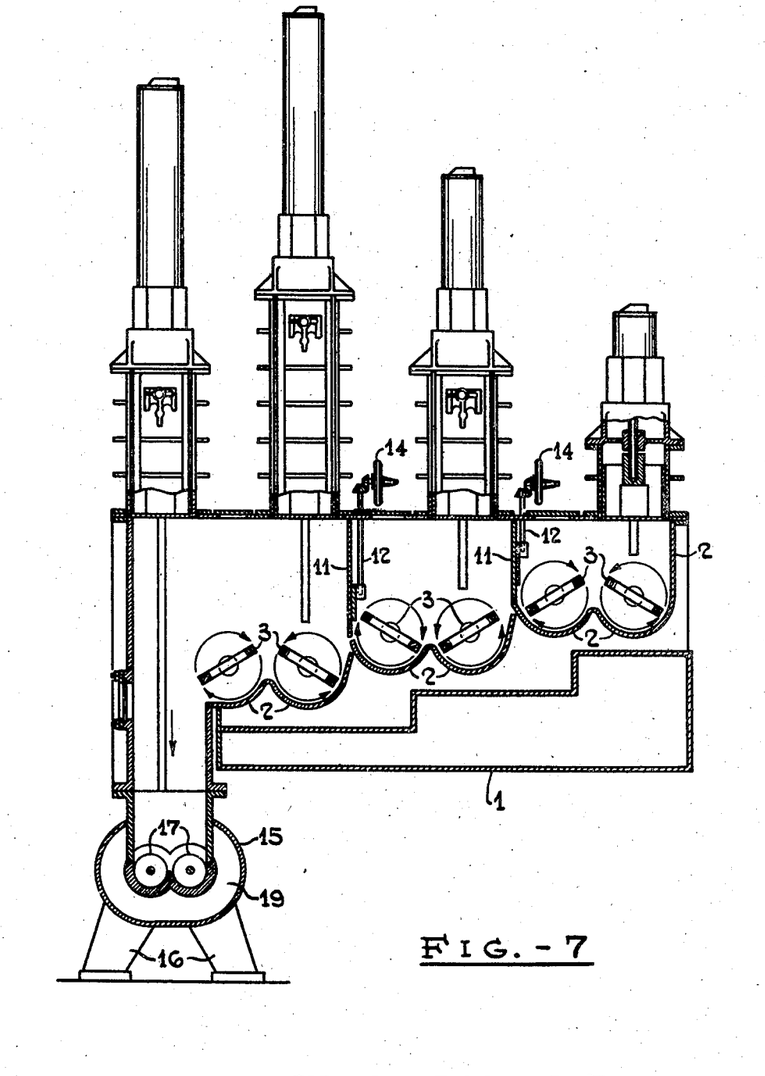
Fig. 7 is a side view in vertical section of an alternative embodiment of Fig. 1 showing means in the form of hydraulically operated top closure members for clearing the kneader members of excess polymer when difficulty is encountered in transferring the polymer from one kneader to another.

Under some operating conditions, especially when the polymer is unusually sticky, some difficulty may be encountered in transferring it from kneader to kneader. This difficulty is readily overcome by the use of the ram structures shown in Fig. 7. The plate actuated by the ram is brought down practically against the top of the kneader blades. The reaction between the kneader blades and the ram plate forces the polymer out of the kneader quite rapidly into the next kneader, whereupon the ram plate in the second kneader may be brought down to force the polymer into the third kneader, the third ram then being brought down to force the polymer into the extruder by which it is forced out of the reactor for collection and further handling. It may be noted that relatively very powerful forces may be brought to bear upon the polymer and it may, by this procedure, be transferred through the desired sequence of kneading stages and discharged, under almost any conditions of stickiness, stiffness or toughness, thereby avoiding all question of clogging of the kneader, which is an exceedingly difficult problem with all other types of reactors.

Figure 2:
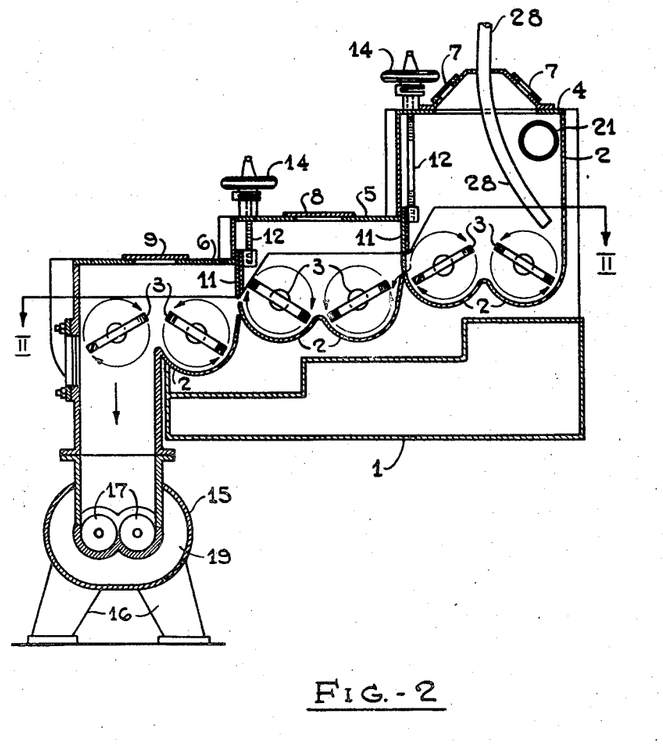
Fig. 2 is a side view in sectional elevation of the embodiment of Fig. 1.

The last kneader of the cascade series has a discharge opening beneath the second of the kneader blades 3 which leads to an extruder device 15 mounted upon legs 16 and having extruder screws 17 terminating at a discharge outlet 18 through which the solid polymer is discharged. The extruder 15 has a steam jacket 19 by which the polymer discharged from the last blade 3 onto the extruder screws 17 is rapidly warmed up and any residual olefinic raw material or diluent-refrigerant is rapidly volatilized and sent backward in countercurrent direction through the successive kneader devices to a gas discharge port 21 which leads to the recovery and recycling processes.

Figure 5:
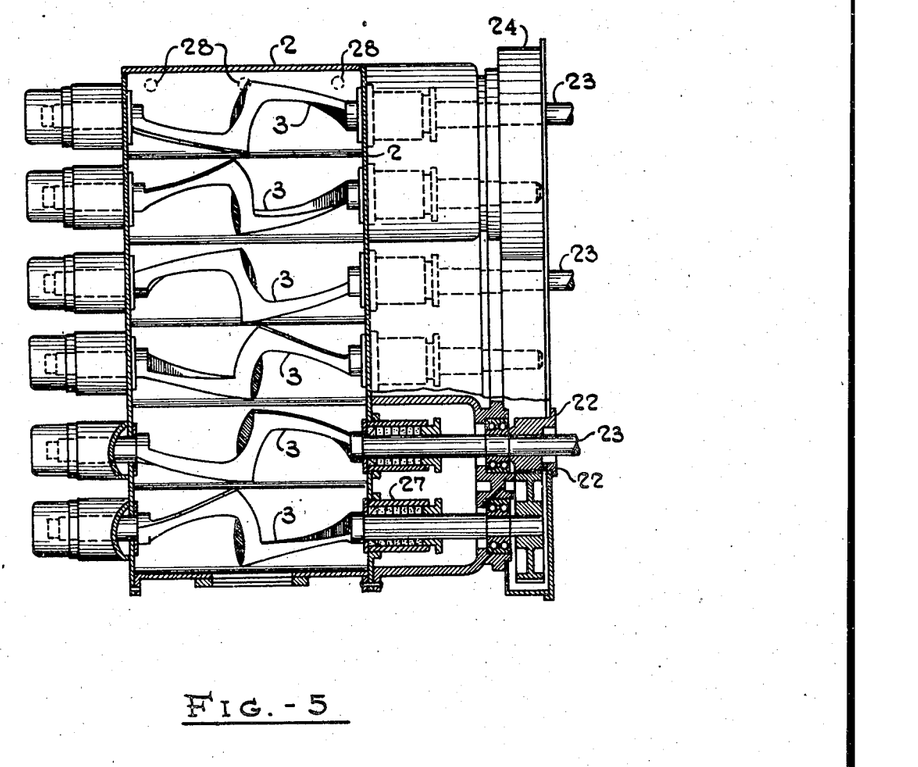
Fig. 5 is a top view of the embodiment of Fig. 1.

The respective pairs of kneader blades 3 are driven in opposite directions by gear members 22, which preferably drive the respective blades 3 of each pair at a 2 to 1 speed ratio. Each pair of blades is preferably driven by a suitable power source applied to the respective shafts 23. This power source may conveniently be individual electric motors (not shown). The gears 22 are desirably shielded and protected by a gear case 24. The respective extruder worms are driven through gears 25 by power from a convenient source supplied through the shaft 26. The respective shafts are desirably equipped with efficient packing glands 27 as shown in Fig. 5 in order to prevent leakage of the polymerization mixture, as well as vaporized portions of the reactant mix resulting from the high heat of reaction of the polymerization from the kneader chambers.

The various components of the polymerization mixture are preferably delivered to the first of the kneaders through delivery pipe lines 28 which are desirably extended inside of the first kneader chamber to a point as close to the first of the kneader blades 3 as possible. The ends of the respective pipes 28 are preferably brought close together, in order to discharge the two streams of reactants and catalyst into the same neighborhood in order to promote as rapid mixing as possible.

The cascade kneader system may be equipped with a single gas outlet 21 as shown, or each of the successive kneader sets may be equipped with separate gas outlets 21.

Figure 3:
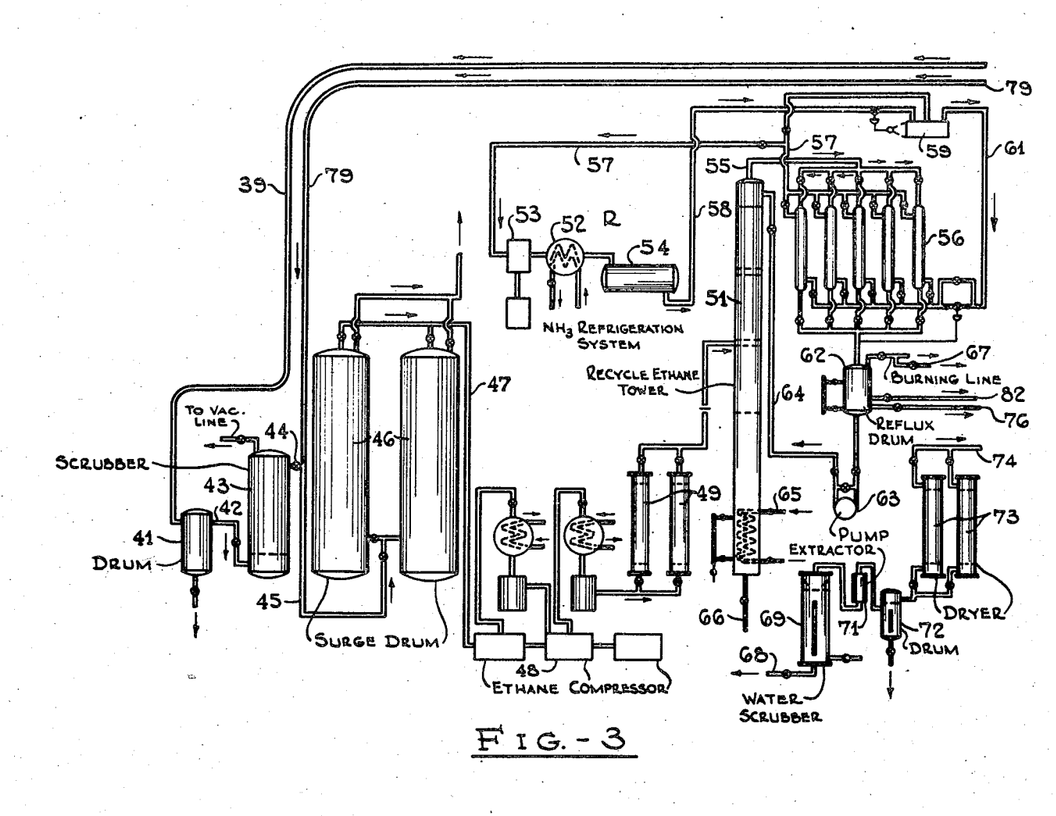
Figs. 3 and 3A together show the flow of materials for the polymerization reaction and the recovery of the volatilized materials and the solid polymer.
Figure 3A:
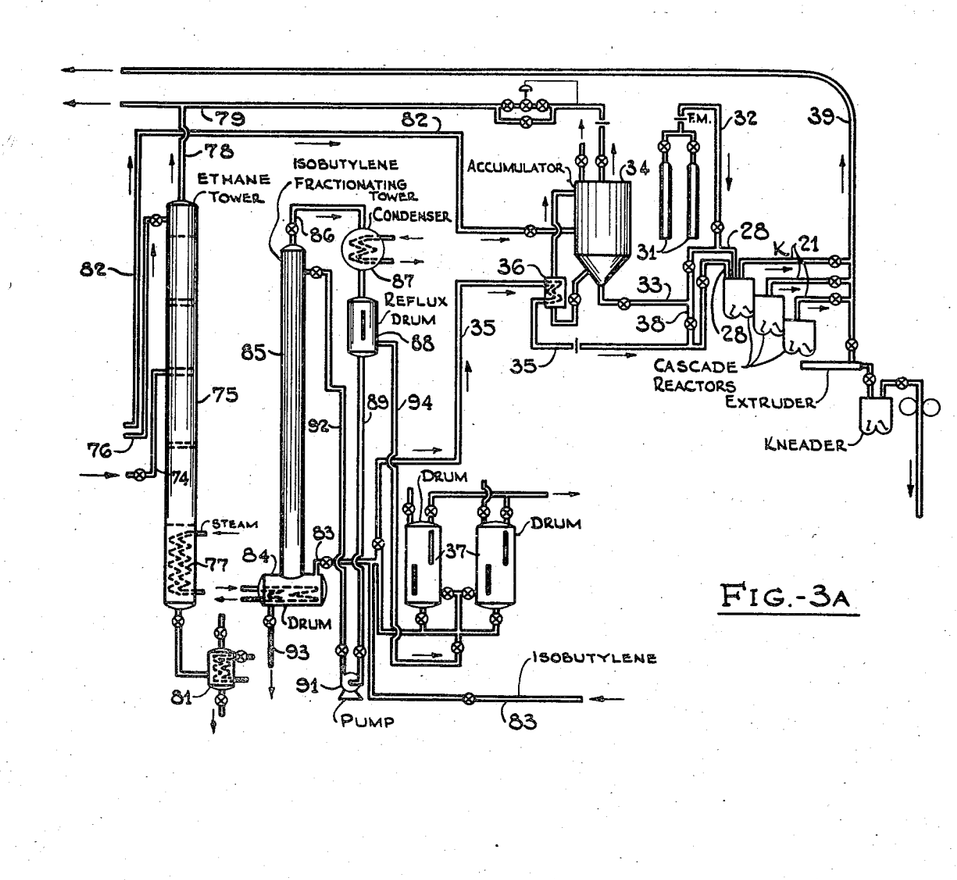
Figure 4:
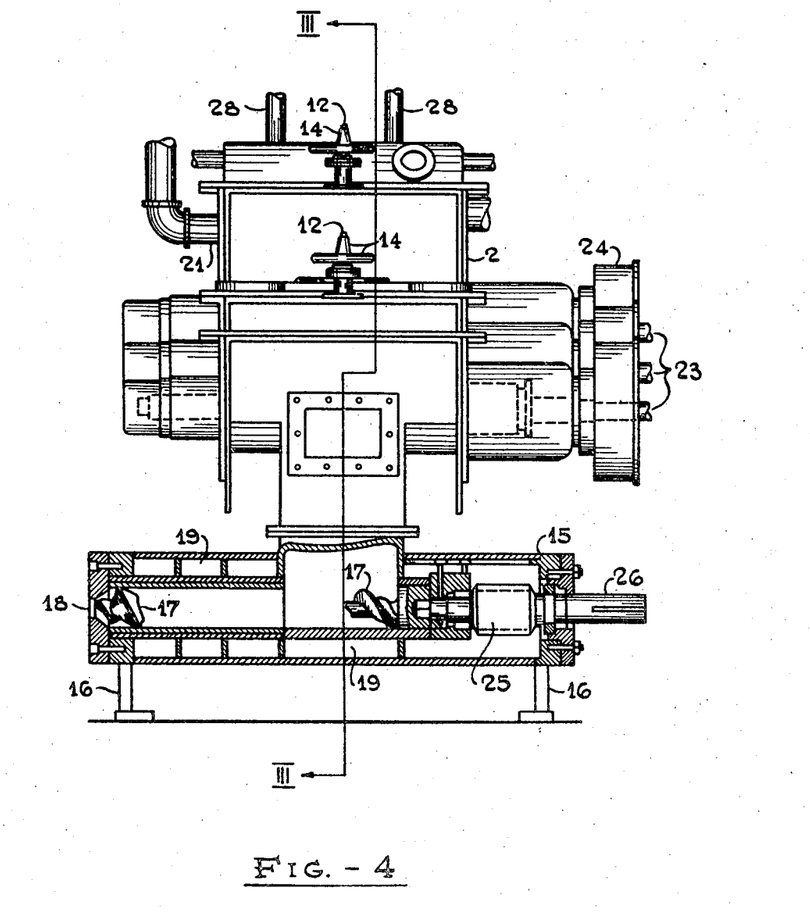
Fig. 4 is an end view, partly in section of the embodiment of Fig. 1.

Referring to Figs. 3 and 3A, the kneader system K, shown at the right of Fig. 3A with the gas outlet pipes 21, and the supply pipes 28, is connected to a source of boron trifluoride in the form of cylinders of the liquefied gas 31 which are connected through a pipe and valve system 32 to one of the supply pipes 28, which is also connected by a supply pipe 33 to a storage reservoir 34 containing a supply of liquid diluent-refrigerant, preferably liquid ethylene. A second of the supply pipes 28 is connected by way of supply pipe 35 and cooler 36 to storage drums 37 containing liquid isobutylene.

A by-pass supply pipe line 38 with control valve as indicated leads from the pipe 33 to the pipe 35 for the delivery of liquid diluent-refrigerant to mix with the liquid isobutylene preparatory to delivery into the kneader system K. The gas outlet pipes 21 are connected to a transfer pipe line 39 which leads, as shown in Fig. 3, to a scrubber drum 41 for the removal of any liquid constituents. From the drum 41 a second pipe line 42 leads to a scrubber device 43 which consists of a closed container charged with calcium oxide which serves to remove from the effluent any residual traces of boron trifluoride. From this drum 43, the ethylene or ethane vapor is discharged through pipe lines 44 and 45 to storage or surge drums 46. From the drums 46 a pipe line 47 leads the effluent, which is largely gaseous ethylene or ethane free from boron trifluoride but containing small quantities of isobutylene, and on occasion small quantities of isobutylene dimer and trimer (and if diolefins are used in the reaction mixture, may contain small quantities of the diolefins), to a compressor system 48 in which the gas is compressed and cooled preparatory to liquefaction. The compressed gas is passed through purifying towers 49 containing solid calcium chloride for the removal of all traces of moisture, to a fractionating column 51. The fractionating column 51 operates under a substantial pressure, preferably in the neighborhood of 400 lbs. per square inch.

There is associated with the tower 51 a reflux condenser system R consisting of a condenser member 52, preferably cooled by ammonia refrigeration, together with a circulating pump 53 and a storage drum 54. The relatively pure ethylene or ethane leaves the column 51 by way of a pipe line 55, which is associated with a series of storage containers 56. A second pipe line 57 is connected to the pipe line 55 through the pipe manifold shown, and is further connected through a control valve to the pump 53, the condenser 52 and the storage tank 54. A pipe line 58 leaves from the storage drum 54 to an auxiliary flow drum 59 and a delivery pipe line 61 to the lower pipe manifold system shown associated with the storage drums 56. Liquid ethylene or ethane condensed under the operating pressure in the condenser 52 is thereby delivered to a storage drum 62 from which a portion is removed by the pump 63 and sent by way of pipe line 64 to the top of the fractionating column 51 to provide the necessary liquid reflux. A steam coil 65 vaporizes a portion of the reflux at the bottom of the fractionating tower 51, and a portion of the heavy ends is discharged through an outlet pipe 66 from which it may be sent to the waste gas lines. Another portion of the ethylene or ethane, including any traces of hydrogen, or other more difficultly condensable gases may be discharged through the pipe line 67 to a burning line or to the waste gas line as desired.

A supply of impure ethylene or ethane (from the refinery fractionating column) in the form of a $C_2$ cut is received through pipe line 68, passed through a water scrubber 69, through a vapor extractor 71 through a knock-out drum 72 to drier cylinders 73 which are filled with solid calcium chloride to remove all traces of moisture. From the drier drum 73 the raw ethylene or ethane is passed through a pipe line 74 to the tower 75. A substantial portion of cold liquid purified ethylene or ethane is delivered from the storage drum 62 by way of the supply pipe line 76 to the top of the tower 75 to form a reflux. A steam coil 77 is provided in the bottom of the tower 75 to vaporize a portion of the reflux. By this arrangement, substantially pure ethylene (with small quantities only of ethane) or ethane is delivered through the pipe line 78 to the pipe line 79 leading to the pipe line 45 and the ethylene storage drums 46. The heavy ends from the tower 75 are delivered to a flash drum 81 containing a steam coil which converts the liquid material into gas at approximately room temperature, for return to the refinery fuel lines (to avoid the development of low temperatures which would freeze up the lines). Simultaneously, a major portion of the liquid ethylene or ethane is delivered from the storage drum 62 through a pipe line 82 to the storage drum 34 for use in the polymerization reaction.

The nearly pure isobutylene is delivered from the refinery through pipe line 83 to the drum 84 of a fractionating column 85. The nearly pure isobutylene is received from the refinery at approximately atmospheric temperature under a pressure of 40 to 50 pounds, depending on the atmospheric temperature. A portion of the isobutylene is volatilized in the drum 84 and rises through the fractionating column 85 to the pipe line 86 by which it is conducted to condenser 87 where it is condensed and delivered to a reflux drum 88. From the reflux drum 88, a portion of the liquid isobutylene is taken from pipe 89 under the drive of a pump 91 and a second pipe line 92 to a point near the top of the tower 85 to provide the necessary reflux. The heavy ends are discharged through a pipe 93 from the drum 84 to storage or to a flash drum or to other convenient means for disposal. Another portion of the liquid isobutylene is taken from the drum 88 through pipe line 94 to the storage drums 97 in which the liquid isobutylene is stored, and from which it is delivered from the pipe 35 to the polymerization reactor K as above described.

The above outlined procedure suggests the use of liquid hydrocarbons as refrigerants. Carbon dioxide is, however, an equally satisfactory refrigerant. Liquid carbon dioxide at temperatures from −70 to −78° C. shows a very high solubility in the liquid hydrocarbons such as butane, propane, and the like, and the cooling may be obtained by delivering to the reactor a solution of carbon dioxide in propane or butane or even in pentane. The temperature resulting from this mixture is within a very few degrees of the temperature of solid carbon dioxide at −78° C., and temperatures as low as −75 to −77° C. are readily obtained by the use of solutions of liquid carbon dioxide in propane.

*Example 1*

In the operation of the invention, liquid ethylene is withdrawn from the tank 34 through the pipes 33 and 28 into the reactor and allowed to volatilize therein until the entire reactor structure is cooled down to the desired low reaction temperature. During this cooling operation, the volatilized gas is discharged through the pipe 21 to the storage drum 41 and through the scrubber 43 to the drums 46. When the desired low temperature is reached, a further portion of the liquid ethylene is passed through the pipe 38 into the second pipe 28, and thereafter liquid isobutylene or a mixture of isobutylene with one or more of the above-indicated polyolefins from the drums 37 is passed through the pipe 35 and the cooler 36 to the second pipe 28 and discharged into the reactor 2 adjacent the first of the kneader blades 3. Simultaneously with the delivery of the isobutylene-ethylene mixture to the reactor, boron trifluoride is delivered through the line 32 and mixed with and dissolved in the liquid ethylene from pipe 33. By this procedure there is thus discharged through the two pipes 28, simultaneous streams of isobutylene dissolved in liquid ethylene and boron trifluoride dissolved in liquid ethylene.

Alternatively, gaseous boron trifluoride may be delivered to the reactor; preferably through a supply pipe leading to the bottom of the first kneader in the cascade. This is especially effective when isobutylene is being polymerized alone, but it is also satisfactory with mixed olefins, especially mixtures of isobutylene with 2,3 dimethyl butadiene 1,4. This diolefin is particularly advantageous for the procedure here described, because of the fact that it copolymerizes under the influence of boron trifluoride in very closely the exact proportion in which it is present in the mixture, and the polymerization may conveniently be carried to yields ranging from 85 to 95% of the olefinic material fed; whether dissolved boron trifluoride is used, or gaseous boron trifluoride is used. The resulting copolymer cures very readily to a very high-grade substitute for natural rubber.

When other polyolefins are used, it is desirable that either dissolved boron trifluoride in ethylene or ethane or even propane be used or that aluminum chloride in solution in a low-freezing, non-complex-forming solvent such as ethyl or methyl chloride or carbon disulfide be used, since a more nearly proportional copolymerization is obtained, a higher molecular weight is obtained, and a higher yield is obtained, all of these factors resulting in a more satisfactory operation of the process.

The polymerization reaction is a very rapid one, liberating a very substantial amount of heat of reaction, and thereby volatilizing the diluent-refrigerant at a relatively high rate of speed. The reaction is complete in a time interval varying from a few seconds to a very small number of minutes and accordingly, while a pool of the reactants is formed by the streams of material in the bottom of the reaction chamber, the reaction is so rapid that the contents of the reaction chamber (the first kneader in the above outlined embodiments) consists mainly of the solid polymer with only very small amounts to negligible amounts of liquid remaining, and small amounts of liquid adhering to, and occluded in, the solid polymer. The kneader blades 3 in the first kneader throw the solid polymer into the second kneader where a small amount of additional polymerization may occur, but in which the main procedure is the pulverizing and breaking up of the mass of polymer into moderately small granules and the freeing of the polymer from most of the occluded and adhering liquid, the liquid being volatilized and discharged from the kneaders. The action of the kneader blades throws the solid polymer into the third kneader, from which it passes downward to the extruder screw 17.

At this stage, the polymerization is complete, and nearly all of the volatilizable material has been removed from the polymer. The extruder screws 17 may be provided with a steam jacket 19 and the solid polymer, in contact with the screws 17, is rapidly brought up to a much higher temperature, at which it is greatly softened, and all residual traces of volatilizable matter are rapidly driven out.

The solid polymer is caught by the extruder screws 17 and carried toward the discharge end of the extruder. The extruder screws run at a good speed, and the solid polymer is passed rapidly toward the discharge end of the extruder. As long as a substantial quantity of polymer is in contact with the extruder screws, it is pushed to, and through, the outlet. Simultaneously, the solid polymer is compacted at the discharge end into a solid mass filling the entire discharge nozzle, with all of the gaseous and gasified material derived from unpolymerized raw material and from the diluent-refrigerant or other sources, squeezed out of the solid. Under these circumstances, an impervious plug of solid, but somewhat plastic, polymer fills the discharge outlet of the kneader and prevents the loss or leakage of any gaseous material, thereby sealing the discharge end of the system against the loss of valuable materials and sealing the system against emergence of vapors which could produce either a fire hazard or an industrial poison hazard, yet permitting the simple and easy discharge of solid polymer product as rapidly as it is produced, after a series of purification steps to remove substantially all of the undesired and undesirable volatile material.

Thus the polymerization occurs very rapidly in the first kneader, and the reaction is so rapid that little or no pool of reactant materials occurs in the kneader, but the contents of the kneader are mainly solid polymer with a smaller quantity of actively polymerizing liquid reactants. By the time the solid material is broken up and discharged from the first kneader, the reaction is almost entirely complete, and only a small amount of polymerization reaction or negligible amounts of polymerization reaction occur in the second kneader.

The emergent gases from the pipe or pipes 21 consist mainly of gaseous ethylene, but contain smaller quantities of gaseous isobutylene, still smaller quantities of boron trifluoride, and may in some instances contain some traces of isobutylene dimer or trimer, or both. The gaseous effluent is passed to the separatory drum 41 and the calcium oxide scrubber as shown in Fig. 3, where any traces of dimer or trimer and boron trifluoride are removed, leaving substantially only ethylene with minor traces of isobutylene. The ethylene is compressed, purified by fractionation as shown in Figs. 3 and 3A, and is delivered to the storage drum 34 for reuse in the process.

The composition of the reaction mixture, previously mentioned, is subject to considerable variation. A preferred form for the making of the simple polyisobutylene consists of approximately one part by weight of liquid isobutylene with two and one-half to three parts by weight of liquid ethylene, together with from 1.0 part by weight to 0.001 part of boron trifluoride as catalyst. That is, the amount of diluent-refrigerant required to absorb the heat of polymerization is from two and one-half to three times the amount of isobutylene present, and the amount of catalyst required ranges from one-tenth of one per cent by weight of the amount of isobutylene to one per cent by weight of the amount of isobutylene present.

When liquid ethane is used, approximately the same proportions of reactants are satisfactory. When liquid propane is used, approximately the same proportions of reactants are likewise satisfactory.

In the above paragraphs, it has been suggested that a simple mixture containing isobutylene only as a reactant mixture may be used. It is possible, however, to use a considerable number of other mixtures. For instance, the isobutylene may be replaced by methyl ethyl ethylene as the reactant, and more than one olefinic substance may be present as a reactant. Especially there may be used diolefinic constituents such as butadiene, isoprene, cyclopentadiene and dimethylbutadiene, as well as various other diolefinic substances. Likewise, other catalysts than boron fluoride may be used, such as, for instance, aluminum chloride dissolved in a simple solution in a low freezing solvent which does not form a complex with the aluminum chloride, such as ethyl or methyl chloride or carbon disulfide.

Figure 6:
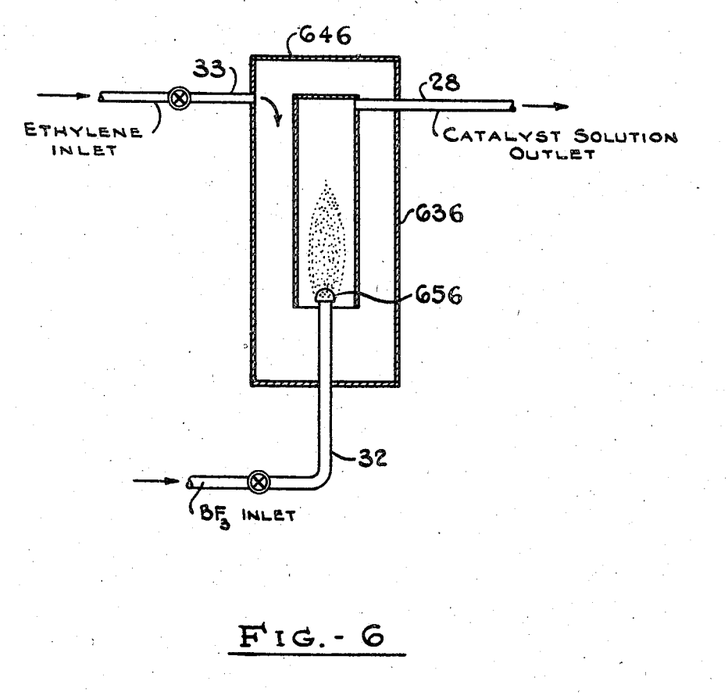
Fig. 6 is a sectional view in vertical elevation of the catalyst dissolving member.

In preparing the respective components of the reaction mixture, the liquid isobutylene and the liquid ethylene may simply be mixed, preferably at the temperature set by the boiling point under atmospheric pressure of the ethylene since the isobutylene (and any other added olefinic materials) are readily soluble in the ethylene which serves as the diluent-refrigerant. In preparing the solution of catalyst, the gaseous boron trifluoride may, if desired, be dissolved in a portion of the liquid ethylene by a device as shown in Fig. 6, although this is not necessary, nor always convenient. This device may conveniently consist of a vessel or container 636 to which the ethylene supply pipe 33 is connected, and within which a secondary member 646 is positioned and connected at the top to the catalyst solution outlet pipe 28. The boron trifluoride pipe 32 is connected to a bubbler head 656 within the member 646. The liquid ethylene flowing from the pipe 33 flows through the member 636, through the member 646 and out the pipe 28 to the reactor and carries with it the catalyst dissolved in the liquid ethylene. Thus the diluent-refrigerant contains dissolved therein the necessary portion of catalyst for the polymerization of the isoolefin mixed with the remainder of the diluent-refrigerant. If desired, the catalyst solution may be made up in a diluent only, with the refrigerant kept separate.

Figure 1:
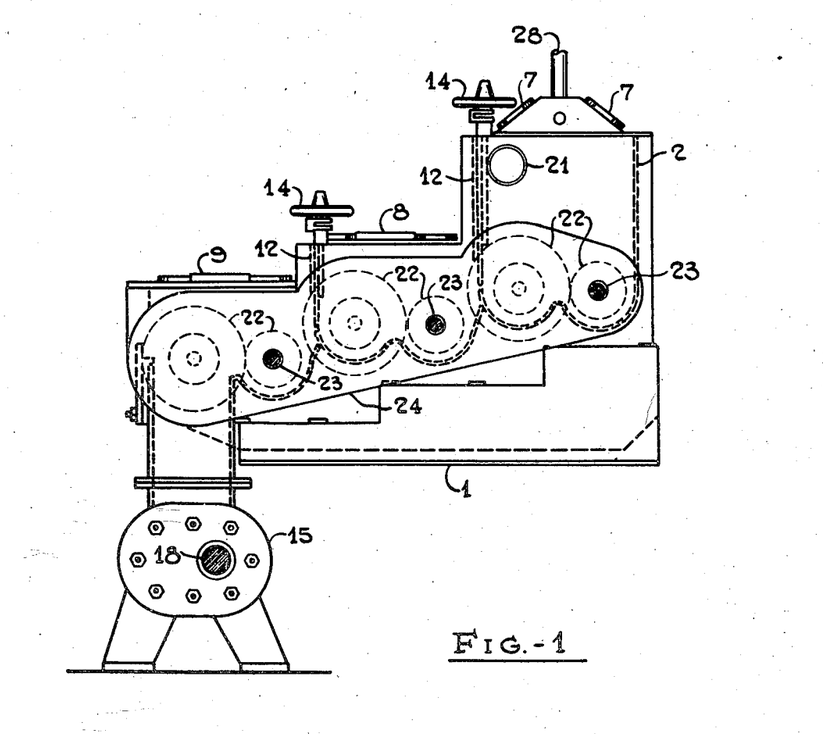
Fig. 1 is a side view in elevation of an embodiment of the polymerization reactor of the invention.

Alternatively, the respective components of the reaction mixture may be delivered separately to the reactor, the isoolefin being delivered through one supply line, the diluent-refrigerant through another and the catalyst through a third. Alternately, gaseous boron trifluoride may be delivered to the reactants in the reactor through a supply pipe 66 entering the bottom of the reactor as shown in Fig. 1. This form is satisfactory, if a sufficiently rapid stirring or agitation of the reactants is available, but in the event that the reaction mixture is only slightly stirred, this is less satisfactory than the other methods above described.

The above described embodiment utilizes a series of reactors arranged in cascade, but it is not necessary that the three be used. Equally satisfactory results, especially when the highest possible molecular weight polymer is not necessary, are obtained by the use of only two kneader members in cascade. In this embodiment, the uppermost pair of blades and container are omitted, and the cover with its sight glasses 7 and inlet pipes 28 is placed over the first one of the two kneaders.

Example 2

A representative kneader polymerization of mixed olefins was conducted on a feed stock prepared from 98.55 parts by weight of isobutylene of 99% purity and 1.45 parts by weight of isoprene of 96% purity. To this was added 400 parts by weight of liquid ethylene. The kneader reactor was cooled by liquid ethylene in a manner similar to that above pointed out and when a temperature of approximately −95° C. was reached, the pure ethylene was discontinued and the feed, prepared as above described, was delivered to the kneader. Simultaneously, approximately 10 parts by weight per 500 of olefinic material of a catalyst consisting of a 0.57% solution of aluminum dibromo chloride in methyl chloride was delivered to the kneader reactor. The polymerization occurred very rapidly as before. A yield of 76.7% of the amount of isobutylene and isoprene was obtained and the polymer had a molecular weight within the range of 24,000 to 120,000 (as determined by the Staudinger viscosity method).

Samples of the polymer were compounded according to the following recipe:

| | Parts by weight |
|---|---|
| Polymer | 100 |
| Zinc oxide | 5 |
| Stearic acid | 5 |
| Sulfur | 3 |
| Tetramethyl thiuram disulfide | 1 |
| Carbon Black | 10 or 50 |

These samples were cured at 307° F. for 30 and 60 minutes; test samples were cut from the cured material and the tensile strength and elongation determined to yield results shown in the following table:

| Stock Cure | Modulus @ 300%, #/in.² | Tensile Strength, #/in.² | Per cent Elongation |
|---|---|---|---|
| 10 pts. black @ 30' cure | 137<br>139 | 3,530<br>3,805<br>3,640 | 925<br>900<br>925 |
| 10 pts. black @ 60' cure | 163<br>163 | 4,130<br>4,060<br>4,040 | 850<br>825<br>825 |
| 50 pts. black @ 30' cure | 359<br>361 | 3,000<br>3,330 | 725<br>725 |
| 50 pts. black @ 60' cure | 509<br>516 | 3,460<br>3,700<br>3,160 | 700<br>725<br>675 |

These results show the excellent polymer which can be produced from isobutylene and isoprene by this procedure.

Example 3

A similar feed stock to that in Example 2 was prepared using piperylene as the polyolefin; 97.5 parts by weight of isobutylene of 99% purity being mixed with 2.5 parts by weight of piperylene of 96% purity. To this mixture there was then added approximately 400 parts by weight of liquid ethylene and the material was stored. The reactor was cooled, as above described, and when the desired low temperature had been reached, the feed mixture containing the olefins was sent to the kneader. Simultaneously, a catalyst, consisting of aluminum chloride in solution in ethyl chloride in a concentration of approximately 0.5% was added at a rate corresponding to approximately 1½% of the rate of delivery of the olefinic feed material. The catalyst was added in the form of a fine spray onto the surface of the feed in the kneader; the kneader blades being continued in operation, submerged in the liquid feed. The reaction began promptly and the polymerization continued until most of the contents of the kneader consisted of solid polymer. Simultaneously, continuing quantities of feed and catalyst were added to the kneader to keep the kneader full of solid polymer and reaction mixture and the procedure was continued as before.

The resulting polymer was compounded according to the recipe of Example 2, and evaluated and found to be readily curable with sulfur, especially in the presence of tetramethyl thiuram disulfide to yield a cured polymer having a tensile strength of approximately 3000 pounds per square inch and an elongation at break of approximately 1150%.

Example 4

An olefinic mixture was prepared consisting of approximately 97 parts by weight of isobutylene of approximately 99% purity and 3 parts by weight of isoprene of approximately 96% purity. To this mixture there was then added approximately 400 parts by weight of liquid ethane; and the prepared mixture was stored as above indicated. The kneader polymerizer was then cooled to approximately −88° C. by the delivery thereto of a substantial quantity of liquid ethane. When the polymerizer was adequately cooled, the supply of liquid ethane was discontinued and the feed, as above prepared, was substituted. When the kneader was nearly full of olefinic feed, a supply of catalyst consisting of a solution of aluminum chloro-bromide in ethane was delivered under high pressure in the form of a very fine jet into the olefinic material while the kneader blades were in normal rotation. The reaction began promptly to yield the desired polymer. In this instance, the catalyst concentration was approximately 0.8%, and approximately 2 parts by weight of catalyst solution per 100 of mixed olefins were used.

As before, the solid polymer was passed from the kneader and eventually extruded through the plate of the extruder. In this instance also, a polymer of similar high tensile strength, high elongation and other desirable characteristics was obtained.

By the device of this invention, there is thus provided a new polymerization mechanism by which the polymerization reaction is conducted in a sealed reactor from which the solid polymer is removed through an extruder which forms a solid seal of polymer to prevent the loss of gaseous or liquid portions of the reaction mixture; and the volatilized portions of the reaction mixture are recovered in a closed system and separated into pure constituents for reuse and recycling.

While there are above disclosed but a limited number of embodiments of the invention, it is possible to produce still other embodiments without departing from the inventive concept herein disclosed.

The invention claimed is:

1. A polymerization process comprising the steps of mixing isobutylene with an inert liquefied normally gaseous organic refrigerant to bring it to a temperature within the range between $-10°$ C. and $-165°$ C., subjecting the mixture to a kneading treatment, and polymerizing the mixture under the influence of a kneading pulling and mixing action by the application thereto of a Friedel-Crafts type catalyst selected from the group consisting of gaseous boron trifluoride, aluminum chloride dissolved in a solvent selected from the group consisting of methyl chloride, ethyl chloride, and carbon disulfide, and boron trifluoride dissolved in said inert refrigerant.

2. A polymerization process comprising the steps of mixing isobutylene with an inert liquefied normally gaseous organic refrigerant to bring it to a temperature within the range between $-10°$ C. and $-165°$ C., subjecting the mixture to successive kneading treatments, polymerizing the mixture to produce a solid polymer under the influence of a kneading pulling and mixing action by the application thereto of a Friedel-Crafts type catalyst selected from the group consisting of gaseous boron trifluoride, aluminum chloride dissolved in a solvent selected from the group consisting of methyl chloride, ethyl chloride, and carbon disulfide, and boron trifluoride dissolved in said inert refrigerant, and removing the solid polymer from the kneading pulling action.

3. A polymerization process comprising the steps of mixing isobutylene with an inert liquefied normally gaseous hydrocarbon refrigerant to bring it to a temperature within the range between $-10°$ C. and $-165°$ C., subjecting the mixture to successive kneading treatments, and polymerizing the mixture under the influence of the kneading pulling action by the application thereto of a Friedel-Crafts type catalyst in fluid condition comprising boron trifluoride.

4. A polymerization process comprising the steps of mixing isobutylene with an inert liquefied normally gaseous hydrocarbon refrigerant to bring it to a temperature within the range between $-10°$ C. and $-165°$ C., subjecting the mixture to successive kneading treatments, polymerizing the mixture under the influence of the kneading pulling action by the application thereto of a Friedel-Crafts type catalyst in fluid condition comprising boron trifluoride to produce a solid polymer, and removing the solid polymer quickly from the pulling action by extruding the solid polymer.

5. A polymerization process comprising the steps of mixing isobutylene with an inert liquefied normally gaseous hydrocarbon refrigerant to bring it to a temperature within the range between $-10°$ C. and $-165°$ C., subjecting the mixture to successive kneading treatments, and polymerizing the mixture under the influence of the kneading pulling action by the application thereto of a Friedel-Crafts type catalyst comprising aluminum chloride dissolved in a solvent selected from the group consisting of methyl chloride, ethyl chloride, and carbon disulfide.

6. A polymerization process comprising the steps of mixing isobutylene with an inert liquefied normally gaseous hydrocarbon refrigerant to bring it to a temperature within the range between $-10°$ C. and $-165°$ C., subjecting the mixture to successive kneading treatments, polymerizing the mixture to produce a solid polymer under the influence of the kneading pulling action by the application thereto of a Friedel-Crafts type catalyst comprising aluminum chloride dissolved in a solvent selected from the group consisting of methyl chloride, ethyl chloride, and carbon disulfide, and removing the solid polymer quickly from the pulling action by extruding the solid polymer.

7. A polymerization process comprising the steps of mixing together isobutylene and dimethyl butadiene at a temperature within the range between $-50°$ C. and $-165°$ C., polymerizing the mixture by the addition thereto of a Friedel-Crafts catalyst in fluid condition comprising gaseous boron trifluoride while subjecting the mixture to successive cold kneading treatments and during the polymerization reaction, removing the solid polymer quickly from the polymerizer.

8. A polymerization process comprising the steps of mixing together isobutylene and dimethyl butadiene at a temperature within the range between $-50°$ C. and $-165°$ C., polymerizing the mixture by the addition thereto of a Friedel-Crafts catalyst in fluid condition comprising dissolved boron trifluoride while subjecting the mixture to successive cold kneading treatments and during the polymerization reaction, removing the solid polymer quickly from the polymerizer.

9. A polymerization process comprising the steps of mixing together isobutylene and dimethyl butadiene at a temperature within the range between $-50°$ C. and $-165°$ C., polymerizing the mixture by the addition thereto of a Friedel-Crafts catalyst in fluid condition, comprising aluminum chloride dissolved in a solvent selected from the group consisting of methyl chloride, ethyl chloride, and carbon disulfide while subjecting the mixture to successive cold kneading treatments and during the polymerization reaction, removing the solid polymer quickly from the polymerizer.

10. A polymerization process comprising the steps of mixing together isobutylene and a conjugated diolefin having 5 to 6 carbon atoms at a temperature within the range between $-50°$ C. and $-165°$ C., polymerizing the mixture by the addition thereto of a Friedel-Crafts catalyst selected from the group consisting of gaseous boron trifluoride, aluminum chloride dissolved in a solvent selected from the group consisting of methyl chloride, ethyl chloride, and carbon disulfide, and boron trifluoride in solution in an inert liquefied normally gaseous organic refrigerant, subjecting the mixture to successive cold kneading treatments while polymerizing the mixture at said low temperature and during the polymerization reaction removing the polymer from the polymerizer.

11. A polymerization process comprising the steps of mixing isobutylene and dimethyl butadiene in the presence of liquid ethylene at a temperature within the range between −50° C. and −165° C., polymerizing the mixture by the addition thereto of a Friedel-Crafts catalyst in fluid condition, comprising gaseous boron trifluoride, subjecting the mixture to successive cold kneading treatments to polymerize the mixture to a solid polymer; and during the polymerization reaction, removing the solid polymer from the polymerizer.

MATTHEW D. MANN, Jr.

REFERENCES CITED

The following references are of record in the file of this patent:

UNITED STATES PATENTS

| Number | Name | Date |
| --- | --- | --- |
| 2,360,632 | Mann et al. | Oct. 17, 1944 |